United States Patent
Machida

(10) Patent No.: US 7,492,479 B2
(45) Date of Patent: Feb. 17, 2009

(54) IMAGE FORMING APPARATUS AND IMAGE FORMING METHOD

(75) Inventor: Hironobu Machida, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 752 days.

(21) Appl. No.: 10/945,747

(22) Filed: Sep. 20, 2004

(65) Prior Publication Data

US 2006/0061831 A1    Mar. 23, 2006

(51) Int. Cl.
- G06F 15/00 (2006.01)
- G06F 11/00 (2006.01)
- H04N 1/04 (2006.01)
- H04N 1/46 (2006.01)

(52) U.S. Cl. .................. 358/1.9; 358/474; 358/501; 358/1.13; 714/23

(58) Field of Classification Search .............. 358/1.9, 358/400, 440, 404–405, 468, 434–436, 442, 358/474, 1.2, 501, 2.1, 1.13, 1.15; 379/100.02; 250/234; 382/168, 169, 271, 176, 180; 714/23, 714/55

See application file for complete search history.

(56) References Cited

U.S. PATENT DOCUMENTS

| | | | | |
|---|---|---|---|---|
| 4,803,682 A | * | 2/1989 | Hara et al. | 714/23 |
| 6,072,595 A | * | 6/2000 | Yoshiura et al. | 358/400 |
| 7,016,086 B2 | * | 3/2006 | Honda | 358/474 |
| 7,283,267 B2 | * | 10/2007 | Mitsubori et al. | 358/1.15 |
| 7,307,758 B2 | * | 12/2007 | Moro | 358/2.1 |
| 2005/0133707 A1 | * | 6/2005 | Ichiyanagi | 250/234 |
| 2005/0134898 A1 | * | 6/2005 | Mifune | 358/1.15 |
| 2005/0207779 A1 | * | 9/2005 | Takahashi et al. | 399/101 |
| 2006/0176515 A1 | * | 8/2006 | Ueda et al. | 358/1.15 |
| 2007/0033530 A1 | * | 2/2007 | Motoyama et al. | 715/736 |

* cited by examiner

Primary Examiner—Edward L Coles
Assistant Examiner—Charlotte M Baker
(74) Attorney, Agent, or Firm—SoCal IP Law Group LLP; Steven C. Sereboff; John E. Gunther

(57) ABSTRACT

In an initializing process at a time of switch-on, a scanner CPU sends an initialization command request to a system CPU. Upon receiving the initialization command request from the scanner CPU, the system CPU sends an initialization command to the scanner CPU. The scanner CPU, which has received the initialization command, executes an initializing process. When the initialization is completed, the scanner CPU informs the system CPU of the completion of initialization. After the system CPU is informed of the completion of initialization from all sub-control units (including a printer CPU and a panel CPU in the embodiment), the system CPU instructs an LCD to display "Ready" and enters a standby state.

12 Claims, 4 Drawing Sheets

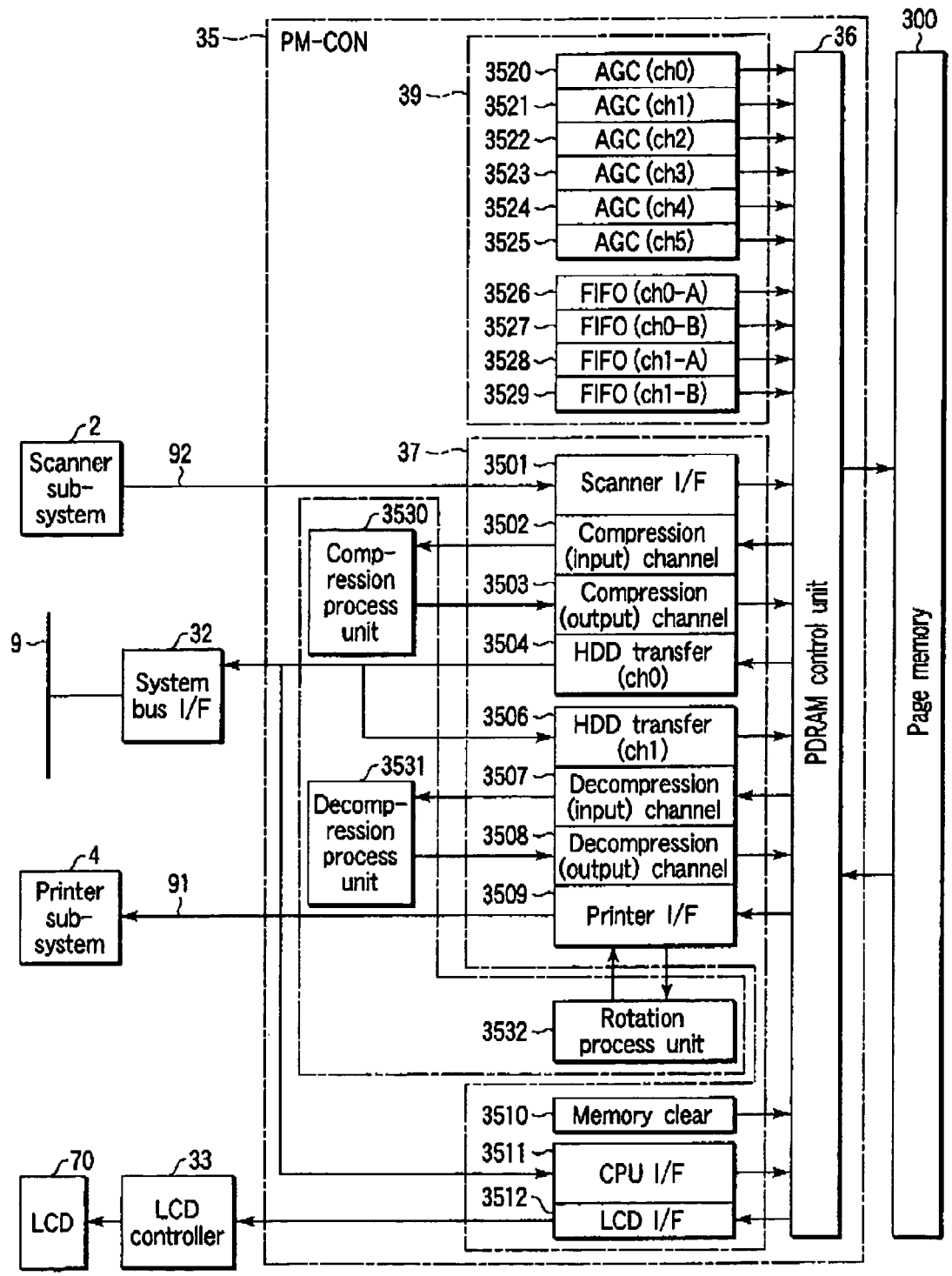
F I G. 4

IMAGE FORMING APPARATUS AND IMAGE FORMING METHOD

BACKGROUND OF THE INVENTION

1. Field of the Invention

The present invention relates to an image forming apparatus such as a digital copying machine, which has a scanner section, a printer section and a control panel, reads an image on an original and forms an image, and to an image forming method.

2. Description of the Related Art

In the prior art, there is known an image forming apparatus such as a digital copying machine, which comprises a single main control unit that executes an overall control, and a plurality of sub-control units that control individual sections (scanner section, printer section, etc.) in accordance with instructions from the main control unit. In this image forming apparatus, when power is switched on, the plural sub-control units start execution of initialization upon receiving initialization instructions from the main control unit that executes an overall control.

In the system in which the sub-control units execute initialization upon receiving initialization instructions from the main control unit, however, it is likely that the sub-control units are erroneously reset by noise, etc. In such a case, the sub-control units wait for initialization instructions from the main control unit, similarly with the time of switch-on. On the other hand, the main control unit does not recognize the reset of the sub-control units, and thus the main control unit does not send initialization instructions to the reset sub-control units. Consequently, matching between the main control unit and sub-control units is lost, leading to a control error. Hence, a process for re-switching on, etc. is required.

BRIEF SUMMARY OF THE INVENTION

The object of an aspect of the present invention is to provide an image forming apparatus and an image forming method, which can establish matching between a main control unit and sub-control units, thereby preventing a control error process.

According to an aspect of the present invention, there is provided an image forming apparatus that reads an image on an original and forms an image, comprising: a plurality of sub-control means for controlling a plurality of units that constitute the apparatus; and main control means for controlling the plurality of sub-control means and controlling an initialization command to the sub-control means on the basis of an initialization command request from each of the sub-control means.

According to another aspect of the present invention, there is provided an image forming method for an image forming apparatus that reads an image on an original and forms an image, comprising: providing single main control means for executing an overall control of the apparatus, and a plurality of sub-control means for controlling a plurality of units that constitute the apparatus in accordance with an instruction from the main control means; and controlling an initialization command to the sub-control means on the basis of an initialization command request from each of the sub-control means.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

FIG. 4 is a view for explaining a PM-COM; and

DETAILED DESCRIPTION OF THE INVENTION

An embodiment of the present invention will now be described with reference to the accompanying drawings.

Figure 1:
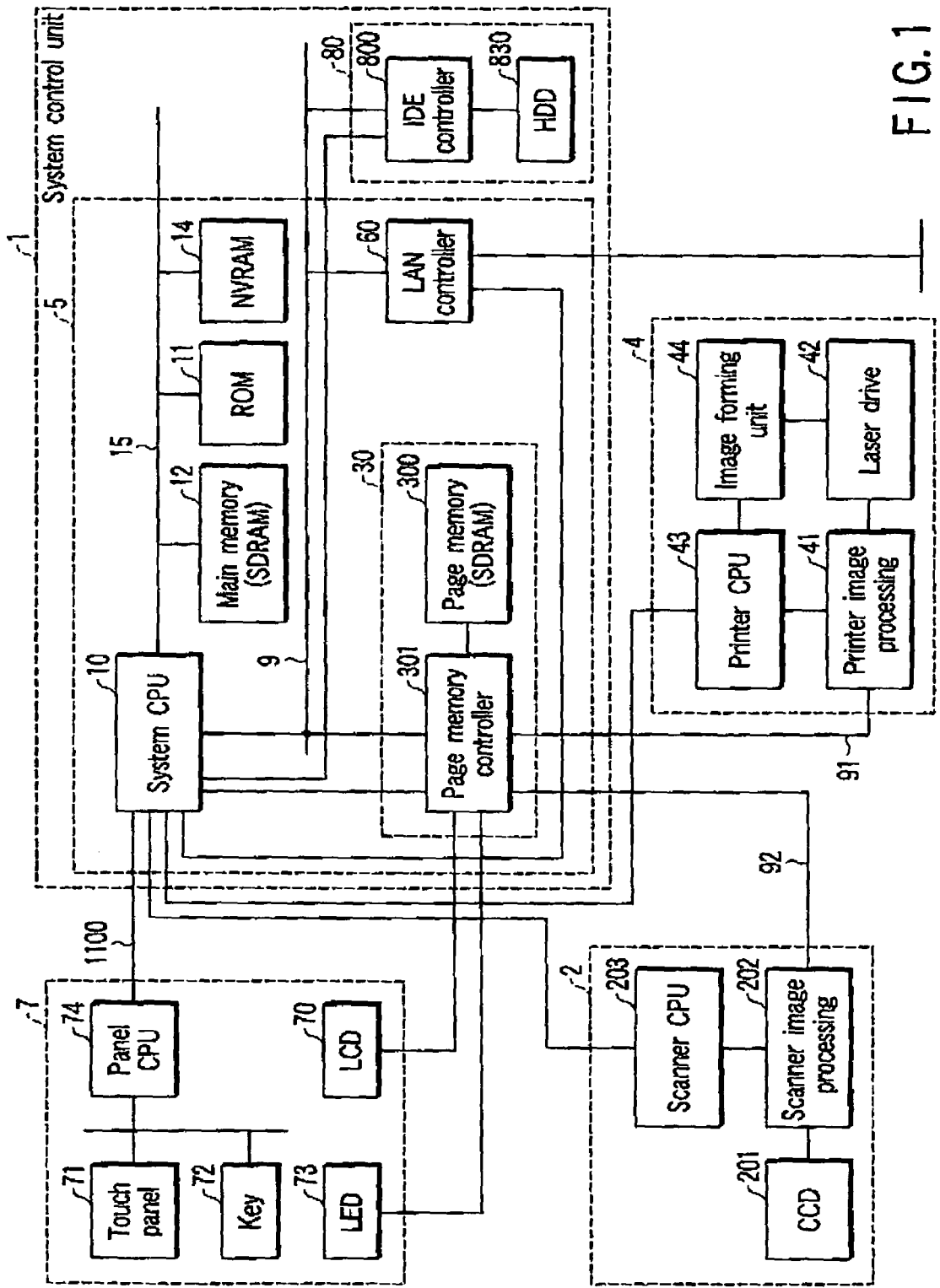
FIG. 1 is a block diagram that schematically shows the structure of an image forming apparatus according to an embodiment of the present invention.

FIG. 1 schematically shows the structure of an image forming apparatus (digital plain-paper copier (DPPC)) according to the embodiment of the invention.

The image forming apparatus comprises a system control unit 1 that executes an overall control, a sub-scanner system 2 that converts image data on an original to a digital signal and inputs the digital signal, a printer sub-system 4 that prints out the image data of the digital signal on paper, and a control panel 7 through which a user executes input operations.

The system control unit 1 comprises a system CPU 10, a ROM 11, a main memory (SDRAM) 12, an NVRAM 14, a page memory control unit 30, a LAN controller 60, and an HDD block 80. The ROM 11, main memory 12 and NVRAM 14 are connected to the system CPU 10 via a local bus 15. In addition, the page memory control unit 30, LAN controller 60 and HDD block 80 are connected to the system CPU 10 via a system bus 9.

The system CPU 10 controls the entirety of the apparatus.

The ROM 11 stores a control program for controlling the entirety of the apparatus.

The main memory 12 comprises a volatile DRAM that is loaded with the control program by the system CPU 10 at the time of power-on. The control program is run in the power-on state.

The NVRAM 14 is backed up by a battery, and stores setting values associated with the machine.

The page memory control unit 30 temporarily stores page-unit image data of a digital signal. The page memory control unit 30 comprises a page memory (SDRAM) 300 that temporarily stores page-unit image data, and a page memory controller 301 that controls the page memory 300.

The HDD block 80 can store a plurality of image data. The HDD block 80 comprises a hard disk drive (HDD) 830 and an IDE controller 800 serving as an interface with the system bus 9.

The LAN controller 60 controls transmission/reception of image data between a personal computer (not shown), which is connected to the network, and the image forming apparatus.

The system control unit 1, as shown in FIG. 1, comprises two circuit boards, i.e. a system control circuit 5 and the HDD block 80.

The system control circuit 5 comprises the system CPU 10, ROM 11, main memory 12, NVRAM 14, local bus 15, page memory control unit 30, LAN controller 60 and system bus 9.

The scanner sub-system 2 comprises a CCD 201, a scanner image processing 202, and a scanner CPU 203. The scanner sub-system 2 also includes an original convey unit (not shown) that conveys an original at a predetermined timing.

The CCD 201 optically reads an original on a line-by-line basis in sync with the conveyance of the original, and converts the read image data to an electric signal.

The scanner image processing 202 converts the electric signal, which is output from the CCD 201, to 8-bit/pixel data, and executes an image process corresponding to a designated image mode such as a character mode, a character/photo mode or a photo mode. Then, the scanner image processing 202 executes a tone process to produce 1-bit/pixel data. The scanner image processing 202 outputs the tone-processed image data at a predetermined timing to the page memory control unit 3 via a scanner image I/F 92.

The scanner CPU 203 controls the scanner sub-system 2.

The printer sub-system 4 comprises a printer image processing 41, a laser drive 42, a printer CPU 43 and an image forming unit 44.

The printer image processing 41 reads out the image data, which is temporarily stored in the page memory 300, via a printer image I/F 91 at a predetermined timing, and executes an image process for the read-out image data in the designated mode.

The laser drive 42 converts the image data, which is output from the printer image processing 41, to image data.

The printer CPU 43 controls the printer sub-system 4.

The image forming unit 44 forms an image by an electrostatic recording method on the basis of an optical signal from the laser drive 42, transfers the image to prescribed paper, and output the paper.

The control panel 7 comprises an LCD 70 that displays the state of the machine and various parameter information, a touch panel 71 that is disposed on the LCD 70, numeral keys 72, a plurality of LEDs 73, and a panel CPU 74 that controls the control panel.

In the above-described configuration, the main control unit is the system CPU 10 of the system control unit 1, and the sub-control units are the scanner CPU 203 of the scanner sub-system 2, the printer CPU 43 of the printer sub-system 4 and the panel CPU 74 of the control panel 7.

Figure 2:
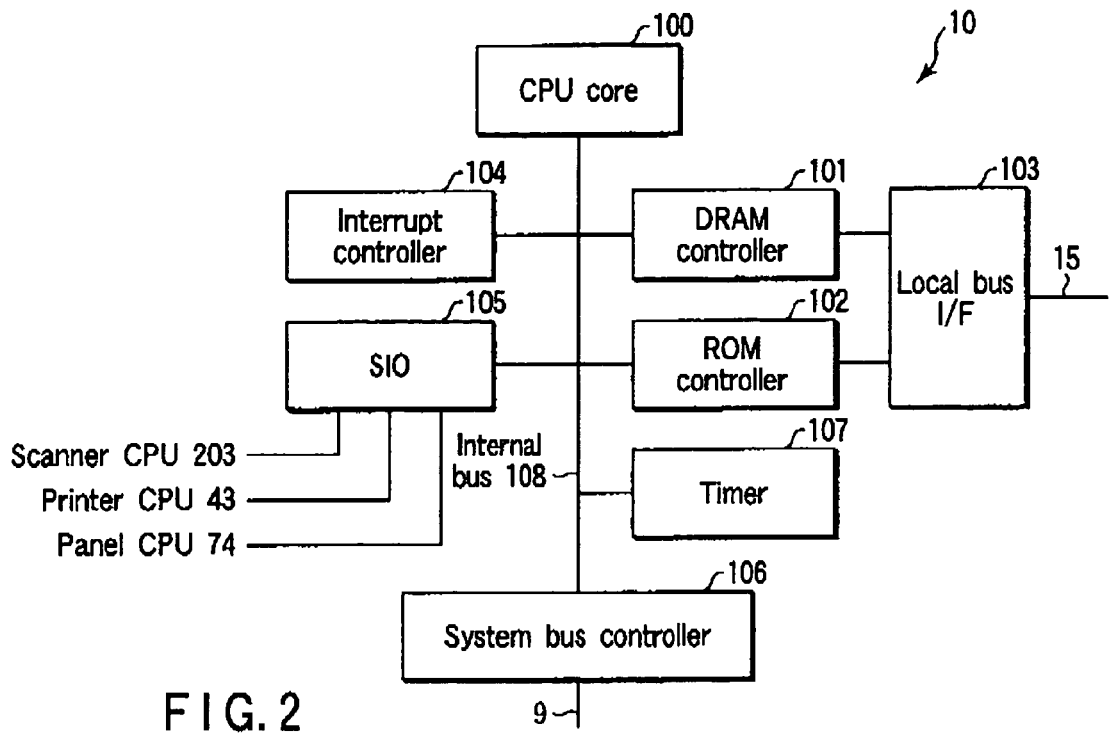
FIG. 2 shows an internal structure of a system CPU.

FIG. 2 shows an internal structure of the system CPU 10.

The system CPU 10 comprises a CPU core 100, a DRAM controller 101, a ROM controller 102, a local bus I/F 103, an interrupt controller 104, a serial I/O 105, a system bus controller 106, a timer 107, and an internal bus 108.

The CPU core 100 executes the control program.

The DRAM controller 101 controls the main memory (SDRAM) 12 on the local bus 15.

The ROM controller 102 controls the ROM 11 and NVRAM 14 on the local bus 15.

The local bus I/F 103 interfaces the local bus 15 with the DRAM controller 101 and ROM controller 102.

The interrupt controller 104 receives interrupts from the blocks in the apparatus, and notifies the CPU core 100 of a single interrupt on the basis of a predetermined order of priority.

The serial I/O 105 functions as an interface for communication between the scanner CPU 203, printer CPU 43, control panel CPU 74 and system CPU core 100. The serial I/O 105 has a 3-channel configuration.

The system bus controller 106, as will be described later in detail, functions as an interface between the respective blocks on the system bus 9 and the respective blocks on the system control unit 1.

The internal bus 108 interconnects the CPU core 100, DRAM controller 101, ROM controller 102, interrupt controller 104, 3-channel serial I/O 105, system bus controller 106, and timer 107.

Figure 3:
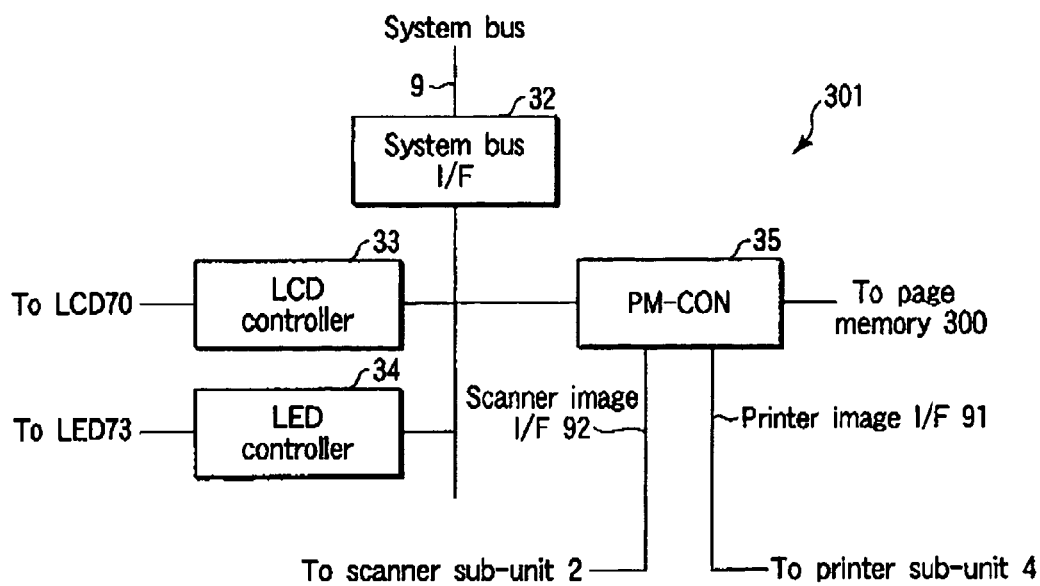
FIG. 3 shows an internal structure of a page memory controller.

FIG. 3 shows an internal structure of the page memory controller 301.

The page memory controller 301 comprises a system bus I/F 32, an LCD controller 33, an LED controller 34 and a PM-CON 35.

The system bus I/F 32 functions as an interface between the respective internal blocks and the system bus 9.

The PM-CON 35 controls the system bus I/F 32, LCD controller 33, LED controller 34 and page memory 300. Further, the PM-CON 35 controls image data transfer between the page memory 300 and the devices (to be described later) on the system bus 9, the scanner sub-unit 2 connected via the scanner image I/F 92, and the printer sub-unit 4 connected via the printer image I/F 91.

The PM-CON 35 mediates access requests from the devices that access the page memory 300 on the basis of a predetermined order of priority, and successively accesses the page memory 300 in accordance with the access requests.

The devices that access the page memory 300 include the scanner image processing 202, printer image processing 41, system CPU 10, LCD controller 33 and IDE controller 800.

The scanner image processing 202 writes image data into the page memory 300 via the scanner image I/F 92.

The printer image processing 41 reads out image data from the page memory 300 via the printer image I/F 91.

The IDE controller 800 stores image data, which is present in the page memory 300, into the HDD 830, or restores image data from the HDD 830 into the page memory 300.

The page memory 300 includes an area for temporarily storing image data, and a display data area for storing display data that is to be displayed on the LCD 70. The LCD controller 33 periodically reads out display data from the display data area of the page memory 300, and outputs the display data to the LCD 70 in sync with a sync signal that is output from the LCD 70 of the control panel 7. The LCD 70 successively displays the display data.

Next, the PM-CON 35 that controls the page memory 300 is described referring to FIG. 4.

The PM-CON 35 comprises a PDRAM control unit 36, a transfer channel 37, a data process block 38, and an address generator 39.

The transfer channel 37 functions as an interface of data transfer between the page memory 300 and other process blocks. The transfer channel 37 comprises a scanner I/F 3501, a printer I/F 3509, an HDD transfer (ch0) 3504, an HDD transfer (ch1) 3506, a compression (input) channel 3502, a compression (output) channel 3503, a decompression (input) channel 3507, a decompression (output) channel 3508, a memory clear 3510, a CPU I/F 3511, and an LCD I/F 3512.

The data process block 38 comprises a compression process unit 3530, a decompression process unit 3531 and a rotation process unit 3532.

The address generator 39 generates addresses in the page memory 300 for respective channels. The address generator 39 comprises an address generation channel AGC (ch0) 3520, AGC (ch1) 3521, AGC (ch2) 3522, AGC (ch3) 3523, AGC (ch4) 3524, AGC (ch5) 3525, FIFO (ch0-A) 3526, FIFO (ch0-B) 3527, FIFO (ch1-A) 3528 and FIFO (ch1-B) 3529.

The scanner I/F 3501 receives, e.g. 8-pixel unit image data from the scanner sub-system 2 in sync with a sync signal that is output from the scanner sub-system 2. When the scanner I/F 3501 has received 32-pixel image data, which is a data transfer unit for transfer to the page memory 300, the scanner I/F 3501 outputs a transfer request to the PDRAM control unit 36. In this case, in sync with a data transfer permission signal that is output to the PDRAM control unit 36, the scanner I/F 3501 outputs the image data and an address, which is generated by the address generation channel AGC (ch0) 3520 associated with the scanner transfer channel, to the PDRAM control unit 36.

The PDRAM control unit 36 mediates between transfer requests from the respective transfer channels and determines a transfer permission channel on the basis of an order of priority, such as round-robin. In the case of a write process from the transfer channel to the page memory 300, the PDRAM control unit 36 first outputs a transfer permission signal to the transfer channel that is permitted to execute transfer, and receives the image data and address that are transferred from the transfer channel in sync with the transfer permission signal. Subsequently, the PDRAM control unit 36 converts the input address to an address corresponding to the page memory 300, and generates a control signal corresponding to the page memory 300, thus writing the input data in an area corresponding to the address.

Each of the AGC (ch0) 3520, AGC (ch1) 3521, AGC (ch2) 3522, AGC (ch3) 3523, AGC (ch4) 3524 and AGC (ch5) 3525 of the address generator 39 can generate a two-dimensional address corresponding to an original or a paper sheet, and is constituted by a main-scan address counter and a sub-scan address counter (not shown).

The main-scan address counter counts up each time the access of the associated transfer channel is permitted by the PDRAM control unit 36 and the access is completed. When the main-scan address counter reaches a preset value of the original or paper sheet, the sub-scan address counter counts up and the main-scan address counter is cleared.

The above process is repeated, and when both the main-scan address counter and sub-scan address counter reach the preset value of the original or paper sheet, transfer for one page is completed. Thereby, the main-scan address counter and sub-scan address counter are cleared. At the same time, the completion of access of one page is told to the system CPU 10 (page memory completion interrupt signal).

As a result, the image data that is read by the scanner sub-system 2 is stored in the page memory 300.

Next, a compression process for compressing image data that is read is described.

The compression (input) channel 3502 responds to an input request from the compression process unit 3530 and outputs a request to the PDRAM control unit 36. The compression (input) channel 3502 reads out image data from the page memory 300 and delivers it to the compression process unit 3530.

At this time, the setting of the AGC (ch1) 3521 that is used in the address generator 39 is the same as the setting of the AGC (ch0) 3520 that is used for the image data input from the scanner sub-system 2. Thus, the image data that is transferred from the scanner sub-system 2 and stored is compressed by the compression process unit 3530.

If the compressed data is outputtable, the compression process unit 3530 outputs a data output request to the compression (output) channel 3503. The outputtable state, in this context, is a state in which compressed data of a unit (32 bits) that can be written in the page memory 300 is present. The compression (output) channel 3503 writes the data in the page memory 300 in the same manner as the scanner I/F 3501.

Each of the FIFO (ch1-A) 3528, FIFO (ch1-B) 3529, FIFO (ch0-A) 3526 and FIFO (ch0-B) 3527 of the address generator 39 is a one-dimensional address generation channel and is constituted by a register and a loop counter (not shown). The register sets an initial address and a final address. The loop counter counts up the address from the initial address each time access is executed. When the final address is reached, the initial address is loaded and count-up is started from the initial address once again.

The FIFO (ch1-A) 3528 and FIFO (ch1-B) 3529 constitute a pair, and the FIFO (ch0-A) 3526 and FIFO (ch0-B) 3527 constitute another pair. Thus, a 2-channel (ch0, ch1) FIFO counter operation is executed.

The FIFO counter operation is described. Assume now that as regards the channel ch0, the FIFO (ch0-A) 3526 executes write in the page memory 300 and the FIFO (ch0-B) 3527 executes read-out from the page memory 300. In this case, in order to prevent the read-out from the page memory 300 from outpacing the write in the page memory 300, the read-out access is caused to wait when the counter value of the FIFO (ch0-B) 3527 has become equal to the counter value of the FIFO (ch0-A) 3526.

In addition, the write FIFO (ch0-A) 3526 monitors a difference between both counter values. If the difference between the counter values is equal to (final address-initial address), the write-side FIFO (ch0-A) 3526 would overwrite and erase data before the read-out-side FIFO (ch0-B) 3527 executes data read-out. In order to avoid this, the request by the write FIFO (ch0-A) 3526 is caused to stand by.

Thereby, the read-out FIFO (ch0-B) 3527 can read out only the image data that is compressed by the compression process unit 3530.

The HDD transfer (ch0) 3504 and HOD transfer (ch1) 3506 function as interfaces for data transfer between the HDD 830 and page memory 300. If the HDD transfer (ch0) 3504 is in the data inputtable state, it outputs a transfer request and receives compressed data from the page memory 300.

The IDE controller 800 acquires a control right of the system bus 9, and retrieves data from the HDD transfer (ch0) 3504 via the system bus 9 and writes it in the HDD 830. The IDE controller 800 repeats this control. If the compression process for one page is completed, the process operation is finished.

The decompression print operation is performed in an order reverse to the scan compression operation.

To start with, the IDE controller 800 reads out the associated compressed image data from the HDD 830.

The IDE controller 800 outputs a transfer request to the system CPU 10 so as to acquire the system bus 9.

The system bus controller 106 in the system CPU 10 mediates between transfer requests from individual devices on the system bus 9. When the turn of the IDE controller 800 has come, the IDE controller 800 is permitted to execute transfer.

While the transfer by the IDE controller 800 is being permitted, the IDE controller 800 outputs the compressed data to the HDD transfer (ch1) 3506 via the system bus 9.

If the HDD transfer (ch1) 3506 is in the data inputtable state, the IDE controller 800 receives data from the HDD 830 in accordance with a request from the IDE controller 800. If the data that is input by the above process is present in the HDD transfer (ch1) 3506, the HDD transfer (ch1) 3506 outputs a transfer request to the PDRAM control unit 36 and writes data in the page memory 300.

If the decompression (input) channel 3507 can take in data in the channel, it outputs a request to the PDRAM control unit 36, reads out the compressed data that is stored in the page memory 300 from the HDD 830, and transfers the compressed data to the decompression process unit 3531.

The decompression process unit 3531 decompresses the compressed data according to a predetermined algorithm. If the decompressed data is outputtable, the decompression process unit 3531 outputs a request to the decompression (output) channel 3508. The decompression (output) channel 3508 receives the decompressed data, outputs a request to the PDRAM control unit 36, and writes the decompressed data in the page memory 300.

The above-described process is repeated until the decompression process for one page is completed.

If a rotation print instruction is not generated, the printer I/F 3509 reads out image data from the print area of the page memory 300, using the AGC (ch2) 3522, and outputs the image data to the printer sub-system 4 in sync with a sync signal that is output from the printer sub-system 4. If a rotation print request is generated, the printer I/F 3509 reads out image data from the print area of the page memory 300, using the AGC (ch2) 3522, and subjects the image data to a rotation process in the rotation process unit 3532 and outputs the resultant image data to the printer sub-system 4 in sync with a sync signal that is output from the printer sub-system 4.

The panel CPU 74 periodically checks the touch panel 71 and keys 72 for a key input through the control panel 7. If the panel CPU 74 detects depression of a key, the panel CPU 74 transmits a code, which corresponds to the depressed key, to the system CPU 10 via a serial I/F 1100.

The SIO 105 in the system CPU 10 receives the transmitted code data, and informs the CPU core 100 about the reception of the code via the interrupt controller 104.

The CPU core 100 reads out the received data through the SIO 105, thereby recognizing the pressed key.

Next, the initializing operation in the present embodiment with the above-described structure is described with reference to an initialization sequence of FIG. 5.

Figure 5:
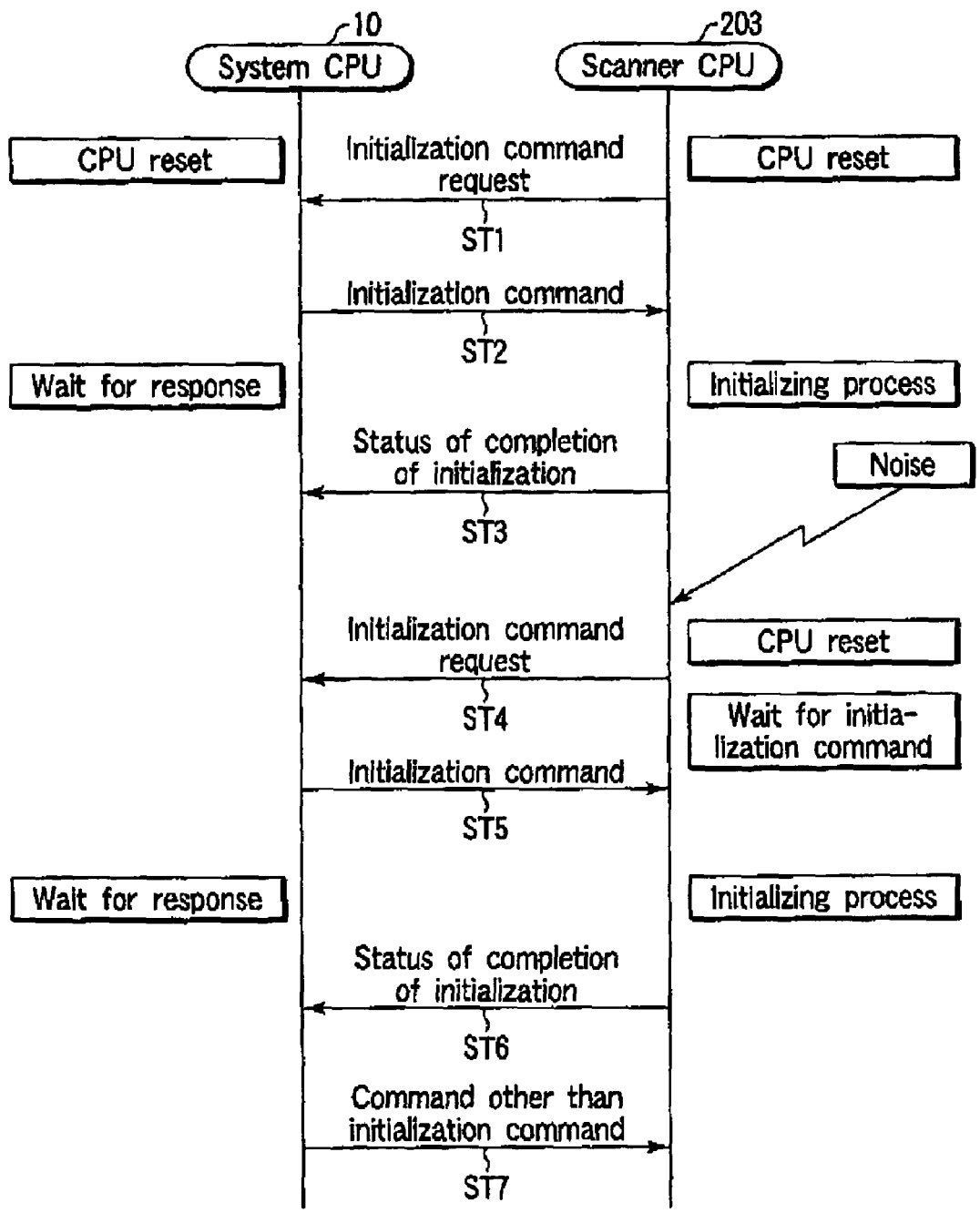
FIG. 5 is a view for explaining an initializing operation in the embodiment.

In FIG. 5, it is assumed that the main control unit is the system CPU 10 and the sub-control unit is the scanner CPU 203. The sub-control unit may also be the printer CPU 43 or the panel CPU 74, which is initialized like the scanner CPU 203, as described below.

When power is switched on, the system CPU 10 and scanner CPU 203 are in the reset state. After a time following the switch-on, the reset state is ended and the system CPU 10 and scanner CPU 203 execute individual initializing processes.

The scanner CPU 203 sends an initialization command request to the system CPU 10 (ST1).

Upon receiving the initialization command request from the scanner CPU 203, the system CPU 10 sends an initialization command to the scanner CPU 203 (ST2).

The scanner CPU 203, which has received the initialization command, executes an initializing process. When the initialization is completed, the scanner CPU 203 informs the system CPU 10 of the completion of initialization (ST3).

After the system CPU 10 is informed of the completion of initialization from all the sub-control units (including the printer CPU 43 and panel CPU 74 in this embodiment), the system CPU 10 instructs the LCD 70 to display "Ready" and enters the standby state.

Assume now that noise is input to the scanner CPU 203 and the scanner CPU 203 is reset.

The scanner CPU 203 sends an initialization command request to the system CPU 10 (ST4).

When the system CPU 10 receives the initialization command request from the scanner CPU 203 at a time other than the time immediately after the switch-on, the system CPU 10 determines that the scanner CPU 203 is erroneously reset, and sends an initialization command to the scanner CPU 203 once again (ST5).

The scanner CPU 203, which has received the initialization command, executes an initializing process. When the initialization is completed, the scanner CPU 203 informs the system CPU 10 of the completion of initialization (ST6).

After the system CPU 10 is informed of the completion of initialization from the scanner CPU 203, the system CPU 10 sends a command other than the initialization command (ST7).

If the system CPU 10 receives an initialization command request from the scanner CPU 203 while a non-completed job is being executed, the system CPU 10 re-sends an initialization command. Upon receiving information on the completion of initialization, the system CPU 10 instructs re-execution of the non-completed job from the beginning. The same control is executed for the printer CPU 43 and printer CPU 74.

As has been described above, according to the embodiment of the present invention, the sub-control unit sends an initialization command request to the main control unit, and then the main control unit sends an initialization command to the sub-control unit. Therefore, mismatching of control can be prevented.

For example, even in the case where the sub-control unit is reset due to, for instance, noise, the main control unit recognizes that the sub-control unit requires initialization, on the basis of an initialization command request that is sent from the reset sub-control unit, and can exactly initialize the sub-control unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
a control panel which has a plurality of keys and outputs an operation signal in accordance with operations of the plurality of keys;
a first sub-CPU that controls an operation by handling the control panel as a controlled object;
a scanner section which outputs image data by scanning a script image;
a second sub-CPU that controls an operation by handling the scanner section as a controlled object;
a printer section which forms an image on a recording medium on the basis of the image data;
a third sub-CPU that controls an operation by handling the printer section as a controlled object; and
a main CPU which causes an image to be formed on the recording medium by the printer section, on the basis of the image data output from the scanner section, in accordance with the operation of the control panel, by controlling the first sub-CPU, the second sub-CPU, and the third sub-CPU,
wherein at least one of the first sub-CPU, the second sub-CPU, and the third sub-CPU supplies an initialization command request signal to the main CPU upon detecting that an operation of the controlled object thereof is reset,
the main CPU supplies an initialization command signal to the sub-CPU which has output the initialization command request signal, upon receiving the initialization command request signal, and the sub-CPU which receives the initialization command signal initializes the controlled object and normalizes operation of the controlled object.

2. The apparatus according to claim 1, wherein at activation of the apparatus, at least one of the first sub-CPU, the second sub-CPU, and the third sub-CPU supplies the initialization command request signal to the main CPU, the main CPU supplies an initialization command signal to the sub-CPU which has output the initialization command request signal, upon receiving the initialization command request signal, and the sub-CPU which receives the initialization command signal initializes the controlled object and normalizes the operation of the controlled object.

3. The apparatus according to claim 1, wherein the first sub-CPU, the second sub-CPU, and the third sub-CPU communicate with the main CPU via a serial interface.

4. The apparatus according to claim 3, wherein the serial interface receives commands transmitted from the first sub-CPU, the second sub-CPU, and the third sub-CPU and notifies the main CPU of the received commands via an interrupt controller.

5. An image forming apparatus, comprising:

a control panel which has a plurality of keys and outputs an operation signal in accordance with operations of the plurality of keys;

a first sub-control means that controls an operation by handling the control panel as a controlled object;

a scanner section which outputs image data by scanning a script image;

a second sub-control means that controls an operation by handling the scanner section as a controlled object;

a printer section which forms an image on a recording medium on the basis of the image data;

a third sub-control means that controls an operation by handling the printer section as a controlled object; and a main control means which causes an image to be formed on the recording medium by the printer section, on the basis of the image data output from the scanner section, in accordance with the operation of the control panel, by controlling the first sub-control means, the second sub-control means, and the third sub-control means, wherein at least one of the first sub-control means, the second sub-control means, and the third sub-control means supplies an initialization command request signal to the main control means upon detecting that an operation of the controlled object thereof is reset, the main control means supplies an initialization command signal to the sub-control means which has output the initialization command request signal, upon receiving the initialization command request signal, and the sub-control means which receives the initialization command signal initializes the controlled object and normalizes operation of the controlled object.

6. The apparatus according to claim 5, wherein at activation of the apparatus, at least one of the first sub-control means, the second sub-control means, and the third sub-control means supplies the initialization command request signal to the main control means, the main control means supplies an initialization command signal to the sub-control means which has output the initialization command request signal, upon receiving the initialization command request signal, and the sub-control means which receives the initialization command signal initializes the controlled object and normalizes the operation of the controlled object.

7. The apparatus according to claim 5, wherein the first sub-control means, the second sub-control means, and the third sub-control means communicate with the main control means via a serial interface.

8. The apparatus according to claim 7, wherein the serial interface receives commands transmitted from the first sub-control means, the second sub-control means, and the third sub-control means and notifies the main control means of the received commands via an interrupt controller.

9. A method of initializing an image forming apparatus, in the apparatus having a control panel which has a plurality of keys and outputs an operation signal in accordance with operations of the plurality of keys, a first sub-CPU that controls an operation by handling the control panel as a controlled object, a scanner section which outputs image data by scanning a script image, a second sub-CPU that controls an operation by handling the scanner section as a controlled object, a printer section which forms an image on a recording medium on the basis of the image data, a third sub-CPU that controls an operation by handling the printer section as a controlled object, and a main CPU which causes an image to be formed on the recording medium by the printer section, on the basis of the image data output from the scanner section, in accordance with the operation of the control panel, by controlling the first sub-CPU, the second sub-CPU, and the third sub-CPU, the method comprising:

supplying an initialization command request signal from at least one of the first sub-CPU, the second sub-CPU, and the third sub-CPU to the main CPU, upon detecting that an operation of the controlled object thereof is reset;

supplying an initialization command signal from the main CPU to the sub-CPU which has output the initialization command request signal, upon receiving the initialization command request signal; and initializing the controlled object and normalizing the operation of the controlled object by the sub-CPU which receives the initialization command signal.

10. The method according to claim 9, further comprising:

supplying the initialization command request from at least one of the first sub-CPU, the second sub-CPU, and the third sub-CPU to the main CPU, at activation of the apparatus;

supplying an initialization command signal from the main CPU to the sub-CPU which has output the initialization command request signal, upon receiving the initialization command request signal; and initializing the controlled object and normalizing the operation of the controlled object by the sub-CPU which receives the initialization command signal.

11. The method according to claim 9, wherein the first sub-CPU, the second sub-CPU, and the third sub-CPU communicate with the main CPU via a serial interface.

12. The method according to claim 11, wherein the serial interface receives commands from the first sub-CPU, the second sub-CPU, and the third sub-CPU and notifies the main CPU of the received commands via an interrupt controller.

* * * * *